United States Patent
Berneth

Patent Number: 5,952,475
Date of Patent: Sep. 14, 1999

[54] CATIONIC DIPHENYLAMINE DYES AND THEIR ANHYDRO BASES

[75] Inventor: Horst Berneth, Leverkusen, Germany

[73] Assignee: Bayer Aktiengesellschaft, Leverkusen, Germany

[21] Appl. No.: 09/090,744

[22] Filed: Jun. 4, 1998

[30] Foreign Application Priority Data

Jun. 11, 1997 [DE] Germany .......... 197 24 583

[51] Int. Cl.⁶ .......... C09B 29/048; C09B 29/09; C09D 11/02; G11B 7/24
[52] U.S. Cl. .......... 534/607; 106/31.5; 369/288; 548/141
[58] Field of Search .......... 534/607; 106/31.5; 369/288

[56] References Cited

U.S. PATENT DOCUMENTS

| | | | |
|---|---|---|---|
| 4,500,715 | 2/1985 | Füstenwerth | 534/607 X |
| 4,880,769 | 11/1989 | Dix et al. | 503/227 |
| 5,208,325 | 5/1993 | Berneth et al. | 534/607 |
| 5,436,323 | 7/1995 | Berneth et al. | 534/607 |
| 5,725,607 | 3/1998 | Giera et al. | 8/654 |

FOREIGN PATENT DOCUMENTS

| | | |
|---|---|---|
| 023736 | 2/1981 | European Pat. Off. . |
| 384040 | 8/1990 | European Pat. Off. . |
| 4444861 | 8/1996 | Germany . |
| 84/02795 | 7/1998 | WIPO . |

OTHER PUBLICATIONS

T.L. Dawson, Rev. Prog. Coloration, 22, 22(1992).

*Primary Examiner*—Fiona T. Powers
*Attorney, Agent, or Firm*—Joseph C. Gil; Richard E. L. Henderson

[57] ABSTRACT

The novel cationic thiadiazolediphenylamine dyes of the formula (I)

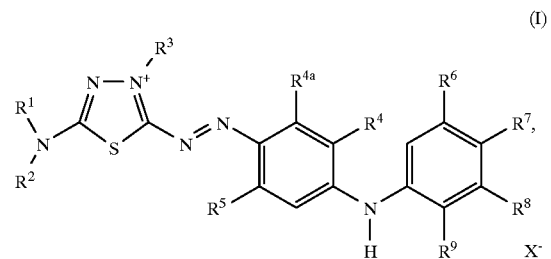

in which the substituents $R^1$ to $R^9$ have the meaning indicated in the description, and their anhydro bases, are suitable for use for inkjet printing and in light-writable data storage media and in dye transfer films.

7 Claims, No Drawings

CATIONIC DIPHENYLAMINE DYES AND THEIR ANHYDRO BASES

The present invention relates to novel cationic diphenylamine dyes, to their anhydro bases, to processes for their preparation and to their use for inkjet printing, and in light-writable data storage media and in dye transfer films.

EP-A-0 579 011 discloses cationic thiadiazolediphenylamine dyestuffs and their anhydro bases. The dyes are used essentially for dyeing various textile and non-textile materials. They are also suitable for use in inkjet inks. Their anhydro bases, in addition, are suitable for sublimation transfer printing.

However, it was found that with the known dyes it was not possible to prepare any inkjet inks that are satisfactory as cyan in three-colour printing. In addition to longwave absorption (>630 nm) it is necessary for the colour to be bright and the dyestuff to be readily soluble. In sublimation transfer printing, the anhydro bases generally gave red shades of moderate light-fastness.

Accordingly, there was a need for dyes which give bright, strong greenish blue shades in inkjet inks and which are readily soluble in the solvents used in inks. There was also a need for anhydro bases which can be used in sublimation or diffusion transfer printing and which give bright, light-fast prints.

The present invention relates to cationic thiadiazolediphenylamine dyes of the formula (I)

$$\text{(I)}$$

in which $R^1$ and $R^2$, independently of one another represent hydrogen, alkyl, alkenyl, cycloalkyl, aralkyl or represent a heterocycle which is optionally attached via a methylene or ethylene bridge, or $R^1$ and $R^2$, together with the nitrogen atom to which they are attached, represent a heterocyclic ring, $R^3$ represents alkyl, alkenyl, cycloalkyl or aralkyl, $R^4$ and $R^9$ independently of one another represent hydrogen, alkyl, alkoxy or halogen, $R^{4a}$ represents hydrogen or $R^4$ and $R^{4a}$ together represent a —CH=CH—CH=CH- bridge, $R^5$ represents hydrogen, alkyl, alkoxy, aryloxy, arylamino, halogen, cyano, alkoxycarbonyl or nitro, $R^6$ and $R^8$ independently of one another represent alkyl, alkoxy or halogen and $R^8$ can additionally represent hydrogen, $R^7$ represents alkoxy, aryloxy or $NR^{10}R^{11}$, or $R^6$ and $R^7$ together form a $$-OCH_2O-,\ -CH_2CH_2O-,\ -CH_2CH_2-N-,$$
$$\phantom{-OCH_2O-,\ -CH_2CH_2O-,\ -CH_2CH_2-}R^{10}$$

$$-CH_2-CH_2CH_2-N-\ \text{or}\ -O-CH_2CH_2-N-$$
$$\phantom{-CH_2-CH_2CH_2-}R^{10}\phantom{\text{or}\ -O-CH_2CH_2-}R^{10}$$

bridge, $R^{10}$ and $R^{11}$ independently of one another represent alkyl, alkenyl, cycloalkyl, aralkyl, aryl or the radical of a heterocycle and $R^{10}$ additionally represents hydrogen or $R^{10}$ and $R^{11}$, together with the nitrogen atom to which they are attached, represent a heterocyclic ring, and where if $R^7$ represents $NR^{10}R^{11}$ $R^6$ and $R^8$ independently of one another have the meaning indicated above and additionally represent hydrogen and $R^5$ has the meaning given above and additionally represents $NHCOR^{12}$ or $NHSO_2R^{13}$, $R^{12}$ and $R^{13}$ independently of one another represent alkyl, alkenyl, cycloalkyl, aryl, the radical of a heterocycle, alkoxy or $NR^{10}R^{11}$ and $R^{12}$ additionally represents hydrogen, and $X^-$ represents an anion.

All above-mentioned alkyl, alkenyl, cycloalkyl, aralkyl, aryl, alkoxy and heterocyclic radicals are optionally substituted with non-ionic substituents.

Nonionic substituents are, for example, the non-dissociating substituents customary in dye chemistry, such as cyano, hydroxy, fluoro, chloro, bromo, nitro, alkyl, monoalkylamino, dialkylamino, alkoxy, phenyl, acyloxy, acylamino, alkoxycarbonyl and alkoxycarbonyloxy.

Alkyl radicals, including those in alkoxy and aralkyl radicals, are, for example, those having 1 to 8, preferably 1 to 4 C atoms. They can also be branched.

Alkenyl radicals are, for example, those having 2 to 6, preferably 2 to 3 C atoms.

Cycloalkyl radicals are, for example, those having 4 to 7, preferably 5 to 6, C atoms.

Halogen is preferably fluoro, chloro or bromo.

Aryl radicals, including those in aralkyl radicals, are preferably phenyl radicals, which can optionally be substituted by 1 to 3 of the above-described nonionic substituents and/or by a carboxyl group.

Heterocyclic radicals are, for example, thienyl, fuiryl and pyridyl, and also their partly or fully hydrogenated derivatives. They can optionally contain 1 to 3 of the above-described nonionic substituents.

Preferred anions are colourless, organic and inorganic anions, examples being chloride, bromide, tetrafluoroborate, tetraphenylborate, triphenylcyanoborate, hydrogensulphate, sulphate, dihydrogenphosphate, hydrogenphosphate, methyl sulphate, ethyl sulphate, tri- and tetrachlorozincate, tetrachloroferrate and anions of saturated and unsaturated aliphatic, cycloaliphatic, aromatic or heterocyclic carboxylic and sulphonic acids having 1 to 22 C atoms, such as formate, acetate, trifluoroacetate, hydroxyacetate, cyanoacetate, propionate, hydroxypropionate, oxalate, citrate, lactate, tartrate, the anion of cyclohexanecarboxylic acid, phenylacetate, benzoate, the anion of nicotinic acid, methanesulphonate, trifluoromethanesulphonate, ethanesulphonate, butanesulphonate, nonafluorobutanesulphonate, hexanesulphonate, octanesulphonate, tetradecanesulphonate, pentadecanesulphonate, benzenesulphonate, chlorobenzenesulphonate, toluenesulphonate, butylbenzenesulphonate, tertbutylbenzenesulphonate or dodecylbenzenesulphonate.

If the anions involved are polyvalent, e.g. sulphate or oxalate, then in formula (I) $X^-$ represents one equivalent of such a polyvalent anion.

Preference is given to cationic thiadiazolediphenylamine dyes, characterized in that in formula (I)

$R^1$ and $R^2$ independently of one another represent in each case optionally hydroxyl-, halogen-, cyano- $C_1$–$C_4$-alkoxy- aminocarbonyl- and/or $C_1$–$C_4$-alkoxycarbonyl-substituted $C_1$–$C_8$-alkyl, allyl, cyclopentyl, cyclohexyl, or represent an in each case optionally halogen-, cyano-, $C_1$–$C_4$-alkyl- and/or $C_1$–$C_4$-alkoxy-substituted benzyl- or phenethyl radical, tetramethylenesulphonyl radical, tetrahydrofiurylmethyl, pyridylmethyl or pyridylethyl radical, or $R^2$ represents hydrogen, or $R^1$ and $R^2$, together with the nitrogen atom to which they are attached, represent a pyrrolidino, piperidino or morpholino radical each of which is optionally substituted by up to 4 methyl groups, or represent a piperazino radical which is optionally substituted on the nitrogen by methyl, ethyl, hydroxyethyl or aminoethyl, $R^3$ represents $C_1$–$C_{20}$-alkyl which is optionally substituted by hydroxyl, halogen, cyano, $C_1$–$C_4$-alkoxy, aminocarbonyl and/or $C_1$–$C_4$-alkoxycarbonyl, or represents allyl or a benzyl or phenethyl radical each of which is optionally substituted by halogen, $C_1$–$C_4$-alkyl and/or $C_f$–$C_4$-alkoxy, $R^4$ and $R^9$ independently of one another represent hydrogen, $C_1$–$C_4$-alkyl, $C_1$–$C_4$-alkoxy or halogen, $R^{4a}$ represents hydrogen or $R^4$ and $R^{4a}$ together represent a —CH=CH—CH=CH- bridge, $R^5$ represents hydrogen, $C_1$–$C_4$-alkyl, $C_1$–$C_4$-alkoxy, $C_6$–$C_{10}$-aryloxy, $C_6$–$C_{10}$-arylamino, halogen, cyano, $C_1$–$C_4$-alkoxycarbonyl or nitro, $R^6$ and $R^8$ independently of one another represent $C_1$–$C_4$-alkyl, $C_1$–$C_4$-alkoxy or halogen, and $R^8$ can additionally represent hydrogen, $R^7$ represents $C_1$–$C_8$-alkoxy, $C_6$–$C_{10}$-aryloxy which is optionally substituted by halogen, cyano, $C_1$–$C_4$-alkyl and/or $C_1$–$C_4$-alkoxy, or represents $NR^{10}R^{11}$, or $R^6$ and $R^7$ together form a

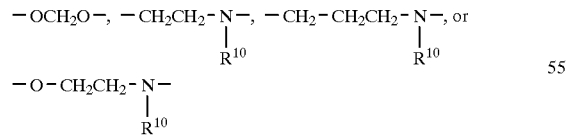

bridge, $R^{10}$ and $R^{11}$ independently of one another represent $C_1$–$C_8$-alkyl which is optionally substituted by hydroxyl, halogen, cyano or $C_1$–$C_4$-alkoxy, or represent allyl, cyclopentyl or cyclohexyl or represent $C_6$–$C_{10}$-aryl or pyridyl each of which is optionally substituted by hydroxyl, halogen, cyano, $C_1$–$C_8$-alkyl, $C_1$–$C_8$-alkoxy or $NR^{10}R^{11}$ or $R^{10}$ represents hydrogen, or $R^{10}$ and $R^{11}$, together with the nitrogen atom to which they are attached, represent a pyrrolidino, piperidino or morpholino radical each of which is optionally substituted by 1 to 4 methyl groups or represent a piperazino radical which is optionally substituted on the nitrogen by methyl, ethyl, hydroxyethyl or aminoethyl, and where if $R^7$ represents $NR^{10}R^{11}$ $R^6$ and $R^8$ independently of one another have the meaning indicated above or represent hydrogen and $R^5$ has the meaning given above or represents $NHCOR^{12}$ or $NHSO_2R^{13}$, $R^{12}$ and $R^{13}$ independently of one another represent $C_1$–$C_{12}$-alkyl or $C_1$–$C_8$-alkoxy each of which is optionally substituted by hydroxyl, halogen, cyano or $C_1$–$C_4$-alkoxy or represent $C_6$–$C_{10}$-aryl, benzyl or pyridyl each of which is optionally substituted by hydroxyl, halogen, cyano, $C_1$–$C_4$-alkyl or $C_1$–$C_4$-alkoxy or represent allyl, cyclopentyl, cyclohexyl or $NR^{10}R^{11}$ or $R^{12}$ represents hydrogen, and $X^-$ represents an anion.

Particular preference is given to cationic thiadiazolediphenylamine dyes characterized in that in formula (I)

$R^1$ and $R^2$ independently of one another represent methyl, ethyl, propyl, isopropyl, butyl, methylpropyl, pentyl, methylbutyl, dimethylpropyl, hexyl, hydroxyethyl, hydroxypropyl, chloroethyl, cyanomethyl, cyanoethyl, cyanopropyl, methoxyethyl, ethoxyethyl, methoxypropyl, aminocarbonylmethyl, aminocarbonylethyl, methoxycarbonylmethyl, methoxycarbonylethyl, allyl, cyclohexyl, benzyl, phenethyl, methylbenzyl, chlorobenzyl, methoxybenzyl, tetramethylenesulphon-3-yl, furfuryl, 2- or 4-pyridylmethyl or 2- or 4-pyridylethyl or $R^2$ represents hydrogen or $R^1$ and $R^2$, together with the nitrogen atom to which they are attached, represent pyrrolidino, piperidino, morpholino or represent piperazino which is optionally substituted on the nitrogen by methyl, ethyl, hydroxyethyl or aminoethyl, $R^3$ represents methyl, ethyl, propyl, butyl, hexyl, octyl, dodecyl, hydroxyethyl, hydroxypropyl, chloroethyl, cyanoethyl, methoxyethyl, ethoxyethyl, methoxypropyl, methoxycarbonylethyl, allyl or benzyl, $R^4$ represents methyl, ethyl, methoxy, ethoxy or chloro, $R^{4a}$ represents hydrogen or $R^4$ and $R^{4a}$ together represent a —CH=CH—CH=CH- bridge, $R^5$ represents hydrogen, methyl, methoxy, chloro or cyano, $R^6$, $R^8$ and $R^9$ independently of one another represent methyl, ethyl, methoxy or ethoxy or $R^8$ and $R^9$ independently of one another represent hydrogen, $R^7$ represents methoxy, ethoxy, propoxy, butoxy, phenoxy or $NR^{10}R^{11}$, or $R^6$ and $R^7$ together form a —O—$CH_2$—O-bridge, $R^{10}$ and $R^{11}$ independently of one another represent methyl, ethyl, propyl, butyl, methylpropyl, pentyl, methylbutyl, dimethylpropyl, hexyl, hydroxyethyl, hydroxypropyl, chloroethyl, cyanomethyl, cyanoethyl, cyanopropyl, methoxyethyl, ethoxyethyl, methoxypropyl, allyl, cyclohexyl, benzyl, phenyl, tolyl, methoxyphenyl, ethoxyphenyl, phenoxyphenyl, chlorophenyl, dimethoxyphenyl, trimethoxyphenyl, dimethylaminophenyl, diethylaminophenyl, dibutylaminophenyl, pyrrolidinophenyl, piperidinophenyl, anilinophenyl, N-methylanilinophenyl or N,N-diphenylaminophenyl or $R^{10}$ represents hydrogen or $R^{10}$ and $R^{11}$, together with the nitrogen atom to which they are attached, represent pyrrolidino, piperidino, morpholino or represent piperazino which is optionally substituted on the nitrogen by methyl, ethyl, hydroxyethyl or aminoethyl and where if $R^7$ represents $NR^{10}R^{11}$ $R^6$ and $R^8$ have the meaning indicated above or independently of one another represent hydrogen and $R^5$ has the meaning indicated above or represents acetylamino, propionylamino, trifluoroacetylamino, methoxy-carbonylamino, methylsulphonylamino or perfluorobutylsulphonylamino, $X^-$ represents an anion.

Very particular preference is given to cationic thiadiazolediphenylamine dyes characterized in that in formula (I)

$R^1$ and $R^2$ independently of one another represent methyl, ethyl, propyl, isopropyl, butyl, hydroxyethyl, hydroxypropyl, cyanoethyl or methoxyethyl or $R^1$ and $R^2$, together with the nitrogen atom lying between them, represent pyrrolidino, piperidino or morpholino, $R^3$ represents methyl, ethyl, propyl, butyl, hexyl or benzyl, $R^4$ represents methoxy, $R^{4a}$ represents hydrogen, $R^5$ represents hydrogen, methyl or methoxy, $R^6$ represents methyl or methoxy, $R^7$ represents methoxy, ethoxy, phenoxy, methylamino, ethylamino, dimethylamino, diethylamino, dibutylamino, anilino, 2-, 3- or 4-methylanilino, 2-, 3- or 4-methoxyanilino, 2,4- or 3,4-dimethoxyanilino, 4-dimethylaminoanilino, N-methylanilino or 4-anilinoanilino, or $R^6$ and $R^7$ together form a —OCH$_2$O-bridge, $R^8$ and $R^9$ represent hydrogen, and $X^-$ represents an anion.

Very particular preference is likewise given to cationic thiadiazolediphenylamine dyes characterized in that in formula (I)

$R^1$ and $R^2$ independently of one another represent methyl, ethyl, propyl, isopropyl, butyl, hydroxyethyl, hydroxypropyl, cyanoethyl or methoxyethyl or $R^1$ and $R^2$, together with the nitrogen atom to which they are attached, represent pyrrolidino, piperidino or morpholino, $R^3$ represents methyl, ethyl, propyl, butyl, hexyl or benzyl, $R^4$ represents methoxy, $R^{4a}$ represents hydrogen, $R^5$ represents hydrogen, methyl, methoxy or acetylamino, $R^6$ represents hydrogen, methyl or methoxy, $R^7$ represents methylamino, ethylamino, dimethylamino, diethylamino, dibutylamino, anilino, 2-3- or 4-methylanilino, 2-3- or 4-methoxyanilino, 2,4- or 3,4-dimethoxyanilino, 4-dimethylaminoanilino, N-methylaniline or 4-anilinoanilino, or $R^6$ and $R^7$ together form a —O—CH$_2$O-bridge, $R^8$ and $R^9$ represent hydrogen, and $X^-$ represents an anion.

The present invention additionally relates to anhydro bases of the formula (II)

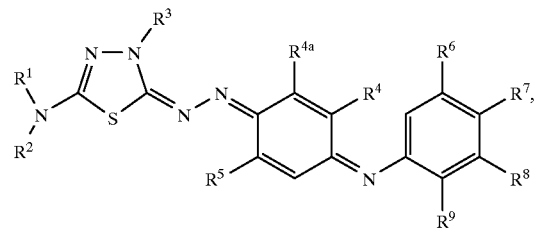

in which $R^1$ to $R^9$ have the meaning indicated above.

In preferred, particularly preferred and very particularly preferred anhydro bases, the radicals $R^1$ to $R^9$ have the meanings indicated above as preferred, particularly preferred and very particularly preferred.

The anhydro bases of the formula (II) can be obtained from the dyes of the formula (I) by reaction with bases in the presence of a solvent.

Examples of bases suitable for this purpose are hydroxides, such as sodium, potassium and calcium hydroxide, oxides, such as magnesium oxide, alcoholates, such as sodium methylate, ethylate and tert-butylate, amines, such as triethylamine, di- or triethanolamine, piperidine or pyridine, or basic ion exchangers which are based, for example, on styrene/divinylbenzene.

Examples of suitable solvents are water, alcohols, such as methanol, ethanol, isopropanol or glycols, ketones such as acetone or butanone, amides, such as dimethylformamide, dimethylacetamide, N-methylpyrrolidone or N-methylcaprolactam, nitriles, such as acetonitrile and 3-hydroxypropionitrile, sulphoxides, such as dimethyl sulphoxide, sulphones, such as sulpholane and dimethyl sulphone, or mixtures thereof.

The anhydro bases of the formula (II) are suitable intermediates for preparing dyes of the formula (I) having those anions $X^-$ which cannot, or not easily, be introduced by one of the preparation processes described below for dyes of the formula (I).

Thus dyes of the formula (I) can be prepared which by varying the anion $X^-$ acquire particular properties, for example better solubility and/or better suitability for preparing liquid formulations. For this purpose it is possible to react anhydro bases of the formula (II) with the acid of the formula HX whose anion is to be introduced. The reaction can optionally be conducted in the presence of a solvent and with cooling, at room temperature or at temperatures up to the boiling point of the medium.

It is also possible, however, to exchange the anions of the dyes of the formula (I) directly, for example by reacting such dyes with salts of the desired new anion, e.g. NaX or $(C_4H_9)_4N^+X^-$, in a suitable solvent.

Solvents can for both processes be, for example, an excess of the acid HX, water, alcohols, such as methanol, ethanol, butanol or diacetone alcohol, diols, such as ethylene glycol, propylene glycol or 1,6-hexanediol, ketones, such as butanone or cyclohexanone, amides, such as ε-caprolactam or N-methylpyrrolidone, nitrites, such as acetonitrile or oxypropionitrile, the solvents set out above in connection with the preparation of the anhydro bases, or mixtures thereof.

Dyes of the formula (I) thus prepared either precipitate from the reaction mixture or give a stable solution therein.

The dyes of the formula (I) can be prepared by processes which are known per se and are described, for example, in EP-A-0 579 011.

One of the processes is characterized in that 2-amino-1, 3,4-thiadiazoles of the formula (III)

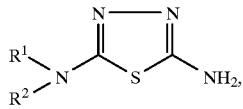

(III)

in which
R$^1$ and R$^2$ have the general, preferred and particularly preferred meaning indicated in connection with formula (I),
are diazotized,
the diazotization products are coupled onto diphenylamine derivatives of the formula (IV)

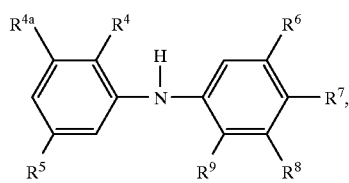

(IV)

in which
R$^4$ to R$^9$ have the general, preferred and particularly preferred meaning indicated in connection with formula (I),
and the products are then quaternized with compounds of the formula (V)

R$^3$X   (V)

in which
R$^3$ and X have the general, preferred and particularly preferred meaning indicated in connection with formula (I), or with precursors thereof.

The 2-amino-1,3,4-thiadiazoles of the formula (III) are known, for example, from DE-A-2 811 258 or are obtainable in analogy thereto. The diphenylamine derivatives of the formula (IV) are known, for example, from Houben-Weyl, Methoden der Organischen Chemie, Volume XI/1 or are obtainable analogously.

The present invention also relates to a further process for preparing cationic thiadiazolediphenylamine dyes of the formula (I), which is characterized in that dyes of the formula (VI)

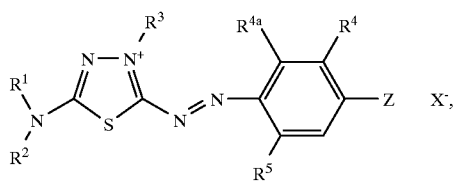

(VI)

in which
R$^1$ to R$^5$ and X$^-$ have the general, preferred and particularly preferred meaning indicated in connection with formula (I), and Z represents halogen, hydroxyl, alkoxy, cycloalkoxy, aryloxy, amino, dialkylamino, acyloxy or acylamino,
are reacted with amines of the formula (VII)

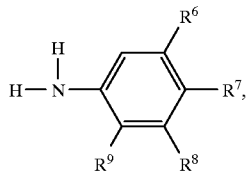

(VII)

in which
R$^6$ to R$^9$ have the general, preferred and particularly preferred meaning indicated in connection with formula (I).

In formula (VI) Z preferably represents fluoro, chloro, bromo, hydroxyl, C$_1$–C$_4$-alkoxy, C$_5$–C$_7$-cycloalkoxy, C$_6$–C$_{10}$-aryloxy, NR'R", where R' and R" independently of one another represent hydrogen or C$_1$–C$_6$-alkyl, or represent C$_1$–C$_6$-alkanoyloxy, C$_6$–C$_{10}$-aroyloxy, C$_1$–C$_6$-alkanesulphonyloxy, C$_6$–C$_{10}$-arylsulphonyloxy, C$_1$–C$_6$-alkanoylamino, C$_6$–C$_{10}$-aroylamino, C$_1$–C$_6$-alkylsulphonylaniino or C$_6$–C$_{10}$-arylsulphonylamino.

Compounds of the formula (VI) can be obtained, for example, by diazotizing 2-amino-1,3,4-thiadiazoles of the formula (III) and coupling the diazotization products onto a benzene derivative of the formula (VIII)

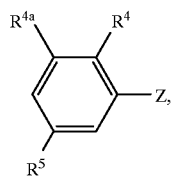

(VIII)

in which
R$^4$, R$^{4a}$ and R$^5$ have the general, preferred and particularly preferred meaning indicated in connection with formula (I), and
Z has the general and preferred meaning indicated in connection with formula (VI),
and optionally, if Z represents hydroxyl or amino, acylating the products with C$_1$–C$_6$-aliphatic or C$_6$–C$_{10}$-aromatic carboxylic anhydrides or carboxylic chlorides or sulphonic chlorides,
and then quaternizing the products with compounds of the formula (IV).

The above-mentioned diazotizations can be conducted in a manner known per se, for example with nitrosylsulphuric acid in from 80 to 90% strength by weight phosphoric acid, or in mixtures of such phosphoric acids with acetic acid, propionic acid and/or sulphuric acid, or with sodium nitrite in aqueous mineral acid, e.g. hydrochloric acid.

The above-mentioned couplings can likewise be conducted in a manner known per se, for example in an acidic medium which can be aqueous or aqueous-organic.

The diazotizations and couplings can also be conducted simultaneously by other processes known per se, for example by conjoint reaction of compounds of the formula (m) and compounds of the formula (IV) with sodium nitrite, for example, in an acidic medium. Examples of suitable acidic media are aqueous mineral acids or organic acids or mixtures thereof, appropriate mineral acids being, for example, hydrochloric acid, sulphuric acid or phosphoric acid and appropriate organic acids being, for example, formic acid, acetic acid or propionic acid. Pressure-liquefied carbon dioxide may also serve as acidic medium.

Suitable quaternizing agents are those of the formula (V) and those which, under reaction conditions, formally give compounds of the formula (V). Examples are alkyl halides, halogenoacetamides, β-halogenopropionitriles, halogenohydrins, alkylene oxides, alkyl esters of sulphuric acid, alkyl esters of organic sulphonic acids, nitriles, amides and esters of α,β-unsaturated carboxylic acids, alkoxyalkyl halides and vinylpyridines. Examples are: methyl chloride, methyl bromide, methyl iodide, benzyl chloride, benzyl bromide, chloroacetamide, β-chloropropionitrile, ethylenechlorohydrin, dimethyl sulphate, diethyl sulphate, methyl benzenesulphonate, ethyl benzenesulphonate, methyl toluenesulphonate, ethyl toluenesulphonate, propyl toluenesulphonate, allyl chloride, allyl bromide, ethylene oxide, propylene oxide, acrylonitrile, acrylic acid, acrylamide, methyl acrylate, 2- and 4-vinylpyridine, sulpholene (=1,1-dioxo-2,5-dihydrothiophene), epichlorohydrin, styrene oxide, dimethyl methylphosphonate and allylphosphoric esters.

The above-mentioned quaternizations can take place, for example, in an inert organic solvent, in water or in mixtures thereof, it being possible optionally to add acid-binding agents, such as magnesium oxide, sodium carbonate, sodium hydrogen carbonate, calcium carbonate or sodium acetate. Examples of suitable organic solvents are hydrocarbons, chlorinated hydrocarbons, nitro hydrocarbons, nitriles, amides, carboxylic acids, carboxylic anhydrides, ketones and dialkyl sulphoxides, such as benzene, toluene, tetrachloroethane, mono- and dichlorobenzene, nitrobenzene, acetonitrile, propionitrile, dimethylformamide, N-methylpyrrolidone, acetic acid, propionic acid, lactic acid, acetic anhydride, acetone, butanone and dimethyl sulphoxide. The reaction of the dyes of the formula (VI) with amines of the formula (VII) can take place optionally in organic solvents, in water or in mixtures thereof Suitable solvents are those described above. The reaction can be conducted optionally with an excess of the amine of the formula (VII) at temperatures of, for example, between 0 and 100° C., preferably those between 10 and 50° C.

The dyes of the formula (I) which form either precipitate directly from the solvents and can be isolated by filtration, for example, or, when water-miscible solvents are used, can be obtained—as solid products which can be isolated by filtration—by dilution with water and addition of water-soluble salts such as sodium or potassium chloride, optionally in the presence of zinc chloride or iron chloride.

The dyes of the formula (I) according to the invention can be used in inks for inkjet printing and in light-writable data storage media.

A further subject of the invention, accordingly, are printing inks which comprise at least one cationic diphenylamine dye of the formula (I), and their use as recording liquids for inkjet recording systems. A preferred form comprises those dyes of the formula (I), mixtures of those dyes of the formula (I) or mixtures of dyes of the formula (I) with other, preferably cationic dyes that are suitable for producing cyan-coloured prints.

By the inkjet method of the process according to the invention is meant an ink-jet recording method in which the ink drops are sprayed onto the substrate. The fine ink droplets can be produced by various methods. They are preferably produced by the common thermal jet, bubble jet, piezo jet or valve inkjet method. These methods are known, for example, from T. L. Dawson, Rev. Prog. Coloration, 22, 22 (1992).

The inks are aqueous dye formulations. The preparation of a stable, concentrated aqueous dyeing formulation can take place in a customary manner, for example by dissolving the dye in water with or without the addition of one or more auxiliaries, for example a hydrotropic compound or a stabilizer.

The aqueous dye formulations generally contain from about 0.5 to 20% by weight of one or more dyes of the formula (I) and from 80 to 99.5% by weight of water and/or solvent and, if desired, further customary constituents.

Preferred organic solvents in this context are alcohols and their ethers or esters, carboxamides, ureas, sulphoxides and sulphones, especially those having molecular weights<200. Examples of particularly suitable solvents are methanol, ethanol, propanol, isopropanol; ethylene glycol, propylene glycol, diethylene glycol, thiodiethylene glycol, dipropylene glycol, pentamethylene glycol, triethylene glycol and polyethylene glycol; butanediol, 1,5-pentanediol, 1,2-dihydroxypropane; glycerol, 1,3,6-hexanetriol; β-hydroxypropionitrile; ethylene glycol monoethyl and propyl ether, ethylene diglycol monoethyl ether, triethylene glycol butyl ether, butylpolyglycol, 1-methoxy-2-propanol, 2-methoxy-1-propanol; formamide, N,N-dimethylformamide, pyrrolidone, caprolactam, N-methylcaprolactam, butyrolactone, caprolactone; 2-hydroxyethyl acetate, 2-(2'-hydroxyethyl)-ethyl acetate, glycol acetate; urea, tetramethylurea, 1,3-dimethyl-2-imidazolidinone, N,N-dimeth-ylolpropyleneurea; dimethyl sulphoxide, dimethyl sulphone, sulpholane.

Further suitable and customary additives for aqueous dye formulations, especially for printing inks, are those ionic or nonionic substances with which it is possible to adjust the viscosity and/or surface tension to the ranges required for use, such as, for example, anionic, cationic or neutral surfactants, such as dispersants and viscosity regulators. The function of viscosity regulators may be taken over by, for example, the organic solvents.

The dye formulations according to the invention may also comprise further dyes which are not of the formula (I).

Preference is given to aqueous dye formulations, especially dye solutions, comprising from 0.5 to 20% by weight, in particular from 1 to 15% by weight, of one or more dyes of which at least one is of the formula (I), from 50 to 99.5% by weight, in particular from 85 to 99% by weight, of water, from 0 to 30% by weight, in particular from 0 to 20% by weight, of one or more organic solvents, from 0 to 30% by weight, in particular from 0 to 10% by weight, of additives which influence the viscosity and/or the surface tension, the sum of these ingredients adding up to 100% by weight.

The aqueous dye formulations can be prepared by dissolving the dyes of the formula (I) in water, or the anhydro bases of the formula (II) in water, with addition of one equivalent of the acid HX as described above. In this case it is optional to add one or more of the above-mentioned organic solvents and/or additives, at a temperature of; for example, from 20 to 100° C., optionally at elevated temperatures from 30 to 100° C., in particular from 30 to 50° C., and/or to add inorganic or organic acids.

Suitable acids are acetic acid, hydroxyacetic acid or lactic acid, but especially acids of the formula HX where X is the anion of the dyes of the formula (I).

The inks are suitable for inkjet printing on normal paper and on coated paper and also on coated plastic films. Coated papers are employed in order to obtain a smoother surface, a higher gloss and/or to improve the properties of the print. This includes improving the water-fastness, the light-fastness and/or the brightness. Plastic films employed are, in particular, transparent films having a printable, ideally transparent coating. For inks which comprise dyes of the formula (I) particularly suitable papers or films are those which carry an acidic coating. Acidic materials of this kind can, for example, be acid clays or silicates, especially those with a sheetlike structure, phenol-formaldehyde resins, or salts of salicylic acids. These materials, together with a binder and optionally further substances such as fillers, are coated onto paper or film.

When the dyes according to the invention are used in the form of their aqueous preparations, as described above in detail, as printing inks for inkjet recording systems, the following advantages result: the physical properties, such as viscosity, surface tension and the like, are within the suitable ranges; the recording liquid does not cause any blockages in the fine output apertures of inljet recording equipment; it gives images of high optical density; on storage, there is no change in the physical properties and/or no deposition of solid constituents in the recording liquid; the recording liquid is suitable for recording on various recording media without restrictions as to the nature of the recording media; the recording liquid fixes rapidly and gives images having excellent water resistance, light-fastness, abrasion resistance and resolution.

A further subject of the invention are light-writable data storage media which comprise at least one cationic diphenylamine dye of the formula (I).

These data storage media are optical recording materials which carry a light-absorbing layer. Exposure of this layer to light, for example using a laser of appropriate wavelength, leads to heating of the exposed area and, consequently, to an alteration therein. For example, the heating may lead to melting, whereby the surface of the layer is altered and forms, for example, small craters. It is also possible on such heating for part of the material to be evaporated, likewise with the formation of craters. The dye of the light-absorbing layer may also be destroyed, either thermally and/or photochemically. It is also possible, for example, for the refractive index of the layer to be altered. In each case, the layer altered in this way contains the data in stored form. These data can be read out again by means of a weaker light source.

The preparation of such light-absorbing layers and their use in data storage media is described, for example, in WO 84/02795 and EP-A 0 023 736.

Data storage media of this kind carry a light-absorbing coating on a substrate, usually a plastic plate having outstanding optical properties (high transparency, no birefringence) and consisting for example of polycarbonate. This coating frequently comprises not only the dye but also a binder. The plastic plate can also, for example, be mirrored, with aluminium for example. The coating is advantageously applied from solution, for example by spin coating. This coating must be very thin, very uniform and of high optical quality. In addition, it must absorb strongly in the range of the light source. Light sources used are lasers, for example laser diodes, which operate in the range from 600 to 700 nm.

Owing to their pronounced absorption in this wavelength range, the dyes of the formula (I) according to the invention are particularly suitable for use in such data storage media. Likewise suitable are mixtures of these dyes. They are readily soluble in the customary coating solvents. These solvents must not attack the plastic plate. Examples of such solvents are ketones and alcohols, such as butanone, cyclohexanone, methanol, ethanol, butanol or diacetone alcohol, or mixtures thereof.

Suitable binders are all film-forming, preferably polymeric materials, examples being polystyrene, poly-α-methylstyrene, polymethyl acrylate, polymethyl methacrylate, polyvinyl chloride, polyvinyl acetate, poly (vinyl acetatelvinylpyrrolidone), polycarbonate, cellulose nitrate, cellulose acetate butyrate or mixtures or copolymers thereof.

The dyes of the formula (I) according to the invention are also outstandingly suitable, furthermore, for the dyeing and printing of cationically dyeable fibres, preferably of polymers and copolymers of acrylonitrile and dicyanoethylene, and of acid-modified fibres of polyamide and polyester, and give fast shades. The dyes can also be used for the dyeing and printing of tanned cellulose materials, paper, silk and leather. They are additionally suitable for producing writing liquids, stamping liquids and ballpoint pastes and can also be used in rubber printing.

The dyeing of for example, polymers and copolymers of acrylonitrile can take place, for example, from a weakly acidic liquor, with the dyebath being entered preferably at from 40 to 60° C. and then dyeing carried out at boiling temperature. It is also possible to carry out dyeing under pressure at temperatures above 100° C. It is possible, furthermore, to use the dyes according to the invention to prepare spinning solutions for dyeing polyacrylonitrile-containing fibres.

The dyeings of the dyes of the formula (I) according to the invention on polyacrylonitrile materials are notable for very good light-, wet- and rub-fastnesses and by a high affinity for the fibre.

The anhydro bases of the formula (II) according to the invention can be used in inks for inkjet printing or in the dye diffusion transfer technique.

A further subject of the invention, accordingly, are printing inks which comprise at least one anhydro base of the formula (II), and the use thereof as recording liquids for inkjet recording systems. A preferred form comprises those anhydro bases of the formula (II), mixtures of such anhydro bases of the formula (II) or mixtures of anhydro bases of the formula (ED with other anhydro bases or protonizable dyes, or precursors thereof, which are suitable, following protonation, for producing cyan-coloured prints.

The inkjet recording process has already been described above.

The inks comprising anhydro bases of the formula (II) are generally not aqueous. However, they may include water as base medium if the anhydro bases of the formula (II) are in dispersed form.

In inks comprising the anhydro bases of the formula (II) in dissolved form use is made of solvents or mixtures thereof Examples of such solvents are ketones, such as butanone or cyclohexanone, for example, nitriles, such as acetonitrile, propionitrile or glutaronitrile, for example, amides, such as dimethylformamide, N-methylpyrrolidone or ε-caprolactam, for example, esters, such as ethyl acetate, butyl acetate, methyl benzoate or dibutyl phthalate, for example, and also natural oils, such as sunflower oil, coconut oil, palm oil, rapeseed oil, olive oil or soya oil, for example, and also the esters of the fatty acids on which such oils are based, such as rapeseed oil fatty acid methyl ester, methyl oleate, 2-ethylhexyl cocoate, isopropyl myristate or methyl isostearate, for example.

Alternatively, the inks can be in the form of dispersions. For this purpose either the anhydro bases of the formula (II) themselves or else their solutions are dispersed in water-immiscible solvents, examples being the above-mentioned esters or natural oils, in water or mixtures of water with solvents that are miscible therewith, examples being the above-mentioned amides or glycols, such as 1,3,6-hexanetriol or 1,5-pentanetriol, for example. The dispersions are stabilized using customary nonionic or ionic dispersants.

The inks are suitable for inkjet printing especially on coated paper or plastic films, but also on non-absorbent, smooth surfaces such as metal or plastic. For inks comprising anhydro bases of the formula (II), particularly suitable papers or films are those which carry an acidic coating. Examples of such acidic materials can be acid clays or silicates, especially those with a sheetlike structure, phenol-formaldehyde resins, or salts of salicylic acids. These materials, together with a binder and optionally further substances such as fillers, are coated onto paper or the film. Such coatings are employed to improve the properties of the print. This includes improving the water-fastness, the light-fastness and/or the brightness. The anhydro bases of the formula (II) are partly of fully protonated on these acidic coating materials to give the dyes of the formula (I).

A further subject of the invention is the use of the anhydro bases of the formula (II) in the dye diffusion transfer technique.

In this case the anhydro bases of the formula (II), mixtures thereof or mixtures thereof with other nonionic, readily diffusing or subliming dyes are incorporated into a layer which is located on a thin support material, made of polyester, for example. If this colour-imparting layer is brought into contact with a receiver layer, which is likewise located on a support material, it is possible—by means of a thermal printing head which is controlled by electrical signals—to transfer the colour-imparting anhydro base, alone or in a mixture with other dyes, from the colour-imparting layer to the receiver layer, where it forms a pattern corresponding to the electrical signals. A procedure of this kind is described, for example, in EP-A 0 384 040.

The receiver layer can be located on textile materials, but especially on paper, plastic films or polymeric webs. These layers are preferably acidic layers. They comprise, for example, acid clays or silicates, especially those with a sheetlike structure, phenol-formaldehyde resins, or salts of salicylic acids. These materials, together with a binder and optionally further substances such as fillers, are coated onto paper or the film. The anhydro bases of the formula (II) are partly or fully protonated on these acidic coating materials to give the dyes of the formula (I). Such receiver layers and a corresponding printing technique are described, for example, in EP-A 0 273 307.

Likewise a subject of the invention are materials for writing on, consisting in particular of coated or uncoated paper or plastic films, which have been written on or printed with inks comprising at least one dye of the formula (I) or at least one anhydro base of the formula (II), or which have been written on by the dye diffusion transfer process with anhydro bases of the formula (II), and also data storage media whose light-absorbing layer comprises at least one dye of the formula (I).

EXAMPLES

Example 1 (dye of the formula (I))

10.7 g of the dye of the formula

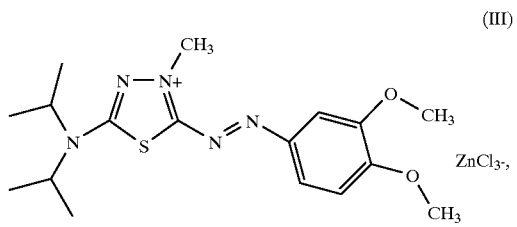

which is described in EP-A 0 717 082, 20.0 g of 4-amino-4'-methoxydiphenylamine hydrochloride and 6.6 g of sodium acetate were stirred in 110 ml of methanol at 50° C. for 6 h. The mixture was diluted with 1.1 l of ethyl acetate and filtered with suction, and the solid product was washed with ethyl acetate and dried in vacuo. It was then stirred into 500 ml of water, the mixture was filtered with suction and the solid product was washed with water and again dried in vacuo. This gave 12.2 g (85% of theory) of the dye of the formula (I) with $R^1=R^2$=isopropyl, $R^3$=methyl, $R^4$=methoxy, $R^5=R^6=R^8=R^9$=hydrogen, $R^7$=4-methoxyanilino and $X^-$=$ZnCl_3^-$.

A solution in methanol/glacial acetic acid 9:1 showed an absorption maximum at 639 nm.

Example 2 (anhydro base of the formula (II))

2,6 g of the dye of Example 1 were dissolved in 200 ml of methanol. 30 ml of 10% by weight sodium hydroxide solution were added dropwise. After stirring for 2 hours, the mixture was filtered with suction and the solid product was washed with methanol. It was stirred into 200 ml of water, the mixture was filtered with suction and the solid product was washed with water and dried in vacuo. This gave 1.9 g (96% of theory) of the anhydro base of the formula (H) with $R^1=R^2$=isopropyl, $R^3$=methyl, $R^4$=methoxy, $R^5=R^6=R^8=R^9$=hydrogen and $R^7$ =4-methoxyanilino A solution in dimethylformamide showed an absorption maximum at 526 nm.

Example 3 (preparation of a solution of a dye of the formula (I))

0.9 g of the anhydro base of Example 2 was suspended in 6 ml of a 92/8 mixture of diacetone alcohol/butanol. 0.25 g of trifluoromethanesulphonic acid was added. The mixture was heated at 70° C. for 5 minutes and then cooled down again. This gave a clear, deep greenish blue solution of the dye of the formula (I) with $R^1=R^2$=isopropyl, $R^3$=methyl, $R^4$=methoxy, $R^5=R^6=R^8=R^9$=hydrogen, $R^7$ =4-methoxyanilino and $X^-$=$F_3CSO_3^-$.

One drop of this solution was spread onto a glass plate. Evaporation of the solvent gave a transparent, greenish blue film which adhered to the glass and resisted abrasion.

The dyes set out in the table below were prepared in a manner similar to that of Example 1:

| Ex. | R¹ | R² | R³ | R⁴ | R⁴ᵃ | R⁵ | R⁶ | R⁷ | R⁸ | R⁹ | X⁻ | λmax in CH₃OH/CH₃COOH 9:1 |
|---|---|---|---|---|---|---|---|---|---|---|---|---|
| 4 | CH(CH₃)₂ | CH(CH₃)₂ | CH₃ | OCH₃ | H | H | H | —NH—C₆H₅ | H | H | ZnCl₃⁻ | 636 nm |
| 5 | CH(CH₃)₂ | CH(CH₃)₂ | CH₃ | OCH₃ | H | H | H | N(C₂H₅)₂ | H | H | ZnCl₃⁻ | 646 nm |
| 6 | CH(CH₃)₂ | CH(CH₃)₂ | CH₃ | OCH₃ | H | H | OCH₃ | OCH₃ | H | H | ZnCl₃⁻ | 618 nm |
| 7 | CH₃ | CH₃ | CH₃ | OCH₃ | H | H | OCH₃ | OCH₃ | H | H | CH₃OSO₃⁻ | 613 nm |
| 8 | CH₃ | CH₃ | CH₃ | OCH₃ | H | H | OCH₃ | —O—CH₂—O— | H | H | CH₃OSO₃⁻ | 627 nm |
| 9 | CH₃ | CH₃ | CH₃ | —CH=CH—CH=CH— | H | OCH₃ | OCH₃ | —OCH₂O— | H | H | CH₃OSO₃⁻ | 645 nm |
| 10 | CH₃ | CH₃ | C₂H₅ | OCH₃ | —CH=CH—CH=CH— | NHCOCH₃ | H | N(CH₃)₂ | H | H | ZnCl₃⁻ | 655 nm |
| 11 | —(CH₂)₄— | | CH₃ | OCH₃ | H | H | CH₃ | —O—C₆H₅ | H | H | Br⁻ | 640 nm |
| 12 | CH₃ | CH₃ | CH₃ | CH₃ | H | H | CH₃ | | OCH₃ | H | CH₃OSO₃⁻ | 608 nm |
| 13 | CH₃ | CH₃ | CH₃ | OCH₃ | H | Cl | OCH₃ | OCH₃ | OCH₃ | H | CH₃OSO₃⁻ | 615 nm |
| 14 | CH₃ | 4-methylcyclohexyl | CH₂—CH=CH₂ | OCH₃ | H | H | CH₃ | OCH₃ | H | OCH₃ | CH₃OSO₃⁻ | 616 nm |

I claim:
1. A cationic thiadiazolediphenylamine dye of the formula (I)

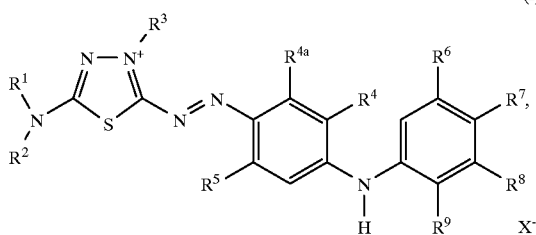

in which
R$^1$ and R$^2$, independently of one another represent hydrogen, allyl, alkenyl, cycloalkyl, aralkyl or represent a heterocycle which is optionally attached via a methylene or ethylene bridge, or R$^1$ and R$^2$, together with the nitrogen atom to which they are attached, represent a heterocyclic ring, R$^3$ represents alkyl, alkenyl, cycloalkyl or aralkyl, R$^4$ and R$^9$ independently of one another represent hydrogen, alkyl, alkoxy or halogen, R$^{4a}$ represents hydrogen or R$^4$ and R$^{4a}$ together represent a —CH=CH—CH=CH-bridge, R$^5$ represents hydrogen, alkyl, alkoxy, aryloxy, arylamino, halogen, cyano, alkoxycarbonyl or nitro, R$^6$ and R$^8$ independently of one another represent alkyl, alkoxy or halogen and R$^8$ can additionally represent hydrogen, R$^7$ represents NR$^{10}$R$^{11}$, or R$^6$ and R$^7$ together form a

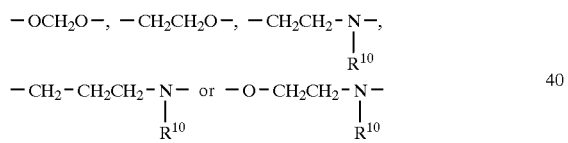

bridge,

R$^{10}$ and R$^{11}$ independently of one another represent alkyl alkenyl, cycloalkyl, aralkyl, aryl or the radical of a heterocycle and R$^{10}$ additionally represents hydrogen or R$^{10}$ and R$^{11}$, together with the nitrogen atom to which they are attached, represent a heterocyclic ring, and X$^-$ represents an anion and wherein all above-mentioned alkyl, alkenyl, cycloalkly, aralkyl, aryl, alkoxy and heterocyclic radicals are optionally substituted with non-ionic substituents.

2. The cationic thiadiazolediphenylamine dye of claim 1 of formula (I) in which

R$^1$ and R$^2$ independently of one another represent in each case optionally hydroxyl-, halogen-, cyano- C$_1$–C$_4$-alkoxy- aminocarbonyl- and/or C$_1$–C$_4$-alkoxycarbonyl-substituted C$_1$–C$_8$-alkyl, allyl, cyclopentyl, cyclohexyl, or represent an in each case optionally halogen-, cyano-, C$_1$–C$_4$-alkyl- and/or C$_1$–C$_4$-alkoxy-substituted benzyl- or phenethyl radical, tetramethylenesulphonyl radical, tetrahydrofurylmethyl, pyridylmethyl or pyridylethyl radical or R$^2$ represents hydrogen, or R$^1$ and R$^2$, together with the nitrogen atom to which they are attached, represent a pyrrolidino, piperidino or morpholino radical each of which is optionally substituted by up to 4 methyl groups, or represent a piperazino radical which is optionally substituted on the nitrogen by methyl, ethyl, hydroxyethyl or aminoethyl, R$^3$ represents C$_1$–C$_{20}$-alkyl which is optionally substituted by hydroxyl, halogen, cyano, C$_1$–C$_4$-alkoxy, aminocarbonyl and/or C$_1$–C$_4$-alkoxycarbonyl, or represents allyl or a benzyl or phenethyl radical each of which is optionally substituted by halogen, C$_1$–C$_4$-alkyl and/or C$_1$–C$_4$-alkoxy, R$^4$ and R$^9$ independently of one another represent hydrogen, C$_1$–C$_4$-alkyl, C$_1$–C$_4$-alkoxy or halogen, R$^{4a}$ represents hydrogen or R$^4$ and R$^{4a}$ together represent a —CH=CH—CH=CH-bridge, R$^5$ represents hydrogen, C$_1$–C$_4$-alkyl, C$_1$–C$_4$-alkoxy, C$_6$–C$_{10}$-aryloxy, C$_6$–C$_{10}$-acylamino, halogen, cyano, C$_1$–C$_4$-alkoxycarbonyl or nitro, R$^6$ and R$^8$ independently of one another represent C$_1$–C$_4$-alkyl, C$_1$–C$_4$-alkoxy or halogen, and R$^8$ can additionally represent hydrogen, R$^7$ represents NR$^{10}$R$^{11}$, or R$^6$ and R$^7$ together form a

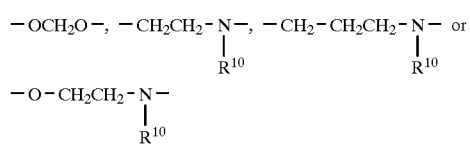

bridge,

R$^{10}$ and R$^{11}$ independently of one another represent C$_1$–C$_8$-alkyl which is optionally substituted by hydroxyl, halogen, cyano or C$_1$–C$_4$-alkoxy, or represent allyl, cyclopentyl or cyclohexyl or represent C$_6$–C$_{10}$-aryl or pyridyl each of which is optionally substituted by hydroxyl, halogen, cyano, C$_1$–C$_8$-alkyl, C$_1$–C$_8$-alkoxy or NR$^{10}$R$^{11}$ or R$^{10}$ represents hydrogen, or R$^{10}$ and R$^{11}$, together with the nitrogen atom to which they are attached, represent a pyrrolidino, piperidino or morpholino radical each of which is optionally substituted by 1 to 4 methyl groups or represent a piperazino radical which is optionally substituted on the nitrogen by methyl ethyl hydroxyethyl or aminoethyl, X$^-$ represents an anion.

3. The cationic thiadiazolediphenylamine dye of claim 1 of formula (I) in which

R$^1$ and R$^2$ independently of one another represent methyl, ethyl, propyl, isopropyl, butyl, methylpropyl, pentyl, methylbutyl, dimethylpropyl, hexyl, hydroxyethyl, hydroxypropyl, chloroethyl, cyanomethyl, cyanoethyl, cyanopropyl, methoxyethyl, ethoxyethyl, methoxypropyl, aminocarbonyl-methyl, aminocarbonylethyl, methoxycarbonylmethyl, methoxycarbonylethyl, allyl, cyclohexyl, benzyl, phenethyl, methylbenzyl, chlorobenzyl, methoxybenzyl, tetramethylenesulphon-3-yl, furfuryl, 2- or 4-pyridylmethyl or 2- or 4-pyridylethyl or R$^2$ represents hydrogen or $R^1$ and $R^2$, together with the nitrogen atom to which they are attached, represent pyrrolidino, piperidino, morpholino or represent piperazino which is optionally substituted on the nitrogen by methyl, ethyl, hydroxyethyl or aminoethyl, $R^3$ represents methyl, ethyl, propyl, butyl, hexyl, octyl, dodecyl, hydroxyethyl, hydroxypropyl, chloroethyl, cyanoethyl, methoxyethyl, ethoxyethyl, methoxypropyl, methoxycarbonylethyl, allyl or benzyl, $R^4$ represents methyl, ethyl, methoxy, ethoxy or chloro, $R^{4a}$ represents hydrogen or $R^4$ and $R^{4a}$ together represent a —CH=CH—CH=CH- bridge, $R^5$ represents hydrogen, methyl, methoxy, chloro or cyano, $R^6$, R8 and $R^9$ independently of one another represent methyl, ethyl, methoxy or ethoxy or $R^8$ and $R^9$ independently of one another represent hydrogen, $R^7$ represents $NR^{10}R^{11}$, or $R^6$ and $R^7$ together form a —O—$CH_2$—O-bridge, $R^{10}$ and $R^{11}$ independently of one another represent methyl, ethyl, propyl, butyl, methylpropyl, pentyl, methylbutyl, dimethylpropyl, hexyl, hydroxyethyl, hydroxypropyl, chloroethyl, cyanomethyl, cyanoethyl, cyanopropyl, methoxyethyl, ethoxyethyl, methoxypropyl, allyl, cyclohexyl, benzyl, phenyl, tolyl, methoxyphenyl, ethoxyphenyl, phenoxyphenyl, chlorophenyl, dimethoxyphenyl, trimethoxyphenyl, dimethylaminophenyl, diethylaminophenyl, dibutylamino-phenyl, pyrrolidinophenyl, piperidinophenyl, anilinophenyl, N-methylanilinophenyl or N,N-diphenylaminophenyl or $R^{10}$ represents hydrogen or $R^{10}$ and $R^{11}$, together with the nitrogen atom to which they are attached, represent pyrrolidino, piperidino, morpholino or represent piperazino which is optionally substituted on the nitrogen by methyl, ethyl, hydroxyethyl or aminoethyl and $X^-$ represents an anion.

4. The cationic thiadiazolediphenylamine dye of claim 1 of formula (I) in which $R^1$ and $R^2$ independently of one another represent methyl, ethyl, propyl, isopropyl, butyl, hydroxyethyl, hydroxypropyl, cyanoethyl or methoxyethyl or $R^1$ and $R^2$, together with the nitrogen atom lying between them, represent pyrrolidino, piperidino or morpholino, $R^3$ represents methyl, ethyl, propyl, butyl, hexyl or benzyl, $R^4$ represents methoxy, $R^{4a}$ represents hydrogen, $R^5$ represents hydrogen, methyl or methoxy, $R^6$ represents methyl or methoxy, $R^7$ represents methylamino, ethylamino, dimethylamino, diethylamino, dibutylamino, anilimo, 2-, 3- or 4-methylanilino, 2-, 3- or 4-methoxyanilino, 2,4- or 3,4-dimethoxyanilino, 4-dimethylaminoanilino, N-methylanilino or 4-anilinoanilino, or $R^6$ and $R^7$ together form a —$OCH_2O$-bridge, $R^8$ and $R^9$ represent hydrogen, and $X^-$ represents an anion.

5. The cationic thiadiazolediphenylamine dye of claim 1 of formula (I) in which $R^1$ and $R^2$ independently of one another represent methyl, ethyl, propyl, isopropyl, butyl, hydroxyethyl, hydroxypropyl, cyanoethyl or methoxyethyl or $R^1$ and $R^2$, together with the nitrogen atom to which they are attached, represent pyrrolidino, piperidino or irorpholino, $R^3$ represents methyl, ethyl, propyl, butyl, hexyl or benzyl, $R^4$ represents methoxy, $R^{4a}$ represents hydrogen, $R^5$ represents hydrogen, methyl, methoxy or acetylamino, $R^6$ represents hydrogen, methyl or methoxy, $R^7$ represents methylamino, ethylamino, dimethylamino, diethylamino, dibutylamino, anilino, 2-3- or 4-methylanilino, 2-3- or 4-methoxyanilino, 2,4- or 3,4-dimethoxyanilino, 4-dimethylaminoanilino, N-methylanilino or 4-anilinoanilino, or $R^6$ and $R^7$ together form a —O—$CH_2O$-bridge, $R^8$ and $R^9$ represent hydrogen, and $X^-$ represents an anion.

6. Inkjet ink comprising at least one cationic thiadiazolediphenylarnine dye according to claim 1.

7. Light-writable data storage media comprising at least one cationic thiadiazolediphenylamine dye according to claim 1.

* * * * *